United States Patent [19]

Haussmann et al.

[11] Patent Number: 4,557,111
[45] Date of Patent: Dec. 10, 1985

[54] CONTROL SYSTEM FOR THE ENGAGEMENT AND DISENGAGEMENT OF EXHAUST GAS TURBOCHARGERS

[75] Inventors: Gerhard Haussmann, Tettnang; Ewald Kamleitner, Friedrichshafen, both of Fed. Rep. of Germany

[73] Assignee: MTU Motoren und Turbinen-Union Friedrichshafen GmbH, Friedrichshafen, Fed. Rep. of Germany

[21] Appl. No.: 481,156

[22] Filed: Apr. 1, 1983

[30] Foreign Application Priority Data

Apr. 3, 1982 [DE] Fed. Rep. of Germany ....... 3212498

[51] Int. Cl.⁴ ............................................. F02B 37/12
[52] U.S. Cl. ......................................... 60/600; 60/612
[58] Field of Search .................. 60/600, 601, 602, 603, 60/612

[56] References Cited

U.S. PATENT DOCUMENTS 2,359,615 10/1944 Browne et al. ................. 60/612 X
4,418,536 12/1983 Deutschmann ................ 60/612 X

FOREIGN PATENT DOCUMENTS 3002474 7/1981 Fed. Rep. of Germany ........ 60/600
54633 4/1980 Japan ..................................... 60/612
41418 4/1981 Japan ..................................... 60/612
248603 2/1948 Switzerland ........................ 60/612
561932 6/1944 United Kingdom .................. 60/600

Primary Examiner—Michael Koczo
Attorney, Agent, or Firm—Craig & Burns

[57] ABSTRACT

A control system for the engagement and disengagement of exhaust gas turbochargers, in which the charging air pressure acts as control magnitude on a first control end face of a slide valve member against the force of a spring; in order to prevent the effects of the strong pressure fluctuation of the charging air pressure, which occur during engagement and disengagement of an exhaust gas turbocharger, on the shifting behavior of the control device, the slide valve member includes a second control end face, on which a second control pressure acts temporarily; the second control pressure and the first control pressure and the working medium for the control system may be formed by the charging air pressure so that no additional pressure sources are required; however, by the use of a spring biased valve the second control pressure may additionally be used for the filling limitation during starting and in the range of lower outputs of the piston driven internal combustion engine.

21 Claims, 4 Drawing Figures

CONTROL SYSTEM FOR THE ENGAGEMENT AND DISENGAGEMENT OF EXHAUST GAS TURBOCHARGERS

The present invention relates to a control system for the engagement and disengagement of at least one exhaust gas turbocharger of a piston driven internal combustion engine with an actuating mechanism for an exhaust gas and a charging air line closure mechanism and with a control device for the actuating mechanism having a slide valve member arranged in a housing which is forced into the position for the disengagement of the exhaust gas turbocharger by the force of a spring acting on the same and which includes a first control end surface, on which the charging air pressure of the reciprocating piston internal combustion engine acts as a first control pressure opposite the spring force.

The disengagement of exhaust gas turbochargers is carried out in piston driven internal combustion engines in order to increase the charging air pressure and charging air quantity when a smaller amount of exhaust gas energy is produced as compared to full load operation, i.e., in the partial load and partial rotational speed range of the piston driven internal combustion engine. Only one exhaust gas turbocharger thereby operates with a low production of exhaust gas energy, whereby one or several exhaust gas turbochargers are sequentially connected in parallel with this one exhaust gas turbocharger with an increase of the output of the piston internal combustion engine, until finally at full load operation, all existing exhaust gas turbochargers operate together. The charging air pressure achievable therewith has for each engaged exhaust gas turbocharger combination a saw-tooth-like curve plotted against output or rotational speed: During the engagement of the additional turbocharger, initially a decrease of the charging air pressure occurs, caused by the decrease of the exhaust gas pressure by reason of the opening of the exhaust gas closure mechanism of the additionally engaged turbocharger. Thereafter, the charging air pressure increases with increasing output until a decrease takes place anew during the engagement of the next turbocharger.

For the control of the engagement and disengagement of the exhaust gas turbochargers, the charging air pressure itself, among others, has been proposed heretofore as a way of measuring the magnitude of the energy contained in the exhaust gas flow. However, by reason of the development of the charging air pressure described hereinabove, after each engagement of an exhaust gas turbocharger, the disengagement thereof would take place immediately following the same with the control device described hereinabove as a result of the pressure decrease.

It is an object of the present invention to avoid the redisengagement and the continuous engagement and disengagement initiated thereby.

The underlying problems are solved according to the present invention in that the slide valve member includes a second control end face, on which a second control pressure acts in such a manner that the slide valve member is forced into the position for the engagement of the exhaust gas turbocharger at a high charging air pressure and into the position for the disengagement of the exhaust gas turbocharger at a lower charging air pressure.

As a result of these measures, the undesired disengagement of the exhaust gas turbocharger by reason of the unavoidable pressure decrease is avoided safely with slight expenditures.

The second control pressure may, with a disengaged exhaust gas turbocharger, act on the slide valve member by way of the second control end face in the same direction as the spring force. It is possible thereby that by closing off the second control pressure, the engagement of the associated exhaust gas turbocharger is brought about without the need that the charging air pressure magnitude otherwise required therefor be present.

However, the second control pressure may, with an engaged exhaust gas turbocharger, also act on the control slide valve member by way of the second control end face in the same direction as the charging air pressure acting on the first control end face. It is possible thereby that by closing off the second control pressure, the disengagement of the associated exhaust gas turbocharger is brought about without the need that the decrease of the charging air pressure necessary therefor has occured.

The second control pressure may be additionally controlled by the slide valve member of the control device or by the actuating mechanism. The second control pressure may be formed advantageously by the charging air pressure and may additionally actuate a cylinder for a control rack abutment in such a manner that the control rack of the piston driven internal combustion engine can traverse only a part of its control rack travel with a disengaged exhaust gas turbocharger.

An effective starting quantity limitation, respectively, filling limitation in the lower rotational speed range can be achieved by this feature in a simple manner.

The control device may be provided directly with control edges and passages for the working medium of the actuating mechanism; however, it is also possible for the slide valve member of the control device to actuate an electrical switch for a solenoid valve controlling the working medium of the actuating mechanism. As a result of these measures, in addition to the charging air pressure, also other criteria, for example, the rotational speed of the piston driven internal combustion engine may be used for the control of the engagement and disengagement. This may be necessary under certain operating conditions.

The use of the charging air pressure as control magnitude is by no means a necessary prerequisite for the present invention. Every similarly progressing pressure, for example, the exhaust gas pressure, may be used as control pressure without departing from the scope of the present invention.

These and other objects, features and advantages of the present invention will become more apparent from the following description when taken in connection with the accompanying drawing which shows, for purposes of illustration only, several embodiments in accordance with the present invention, and wherein.

Figure 1:
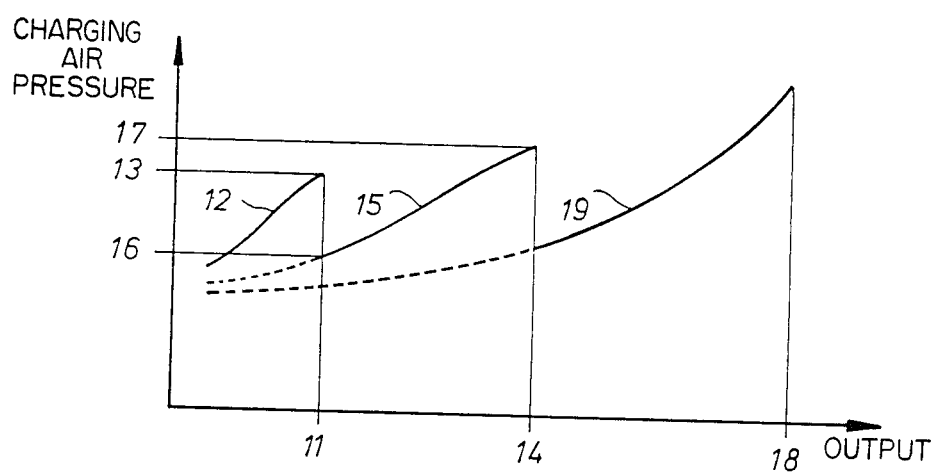
FIG. 1 is a diagram of the charging air pressure of a piston driven internal combustion engine having altogether three exhaust gas turbochargers, of which two are adapted to be disengaged, plotted against the output of the internal combustion engine.

Referring now to the drawing wherein like reference numerals are used throughout the various views to designate like parts, FIG. 1 is a diagram, in which the charging air pressure curve of a piston driven internal combustion engine with three exhaust gas turbochargers is plotted against the output of the internal combustion engine.

In the lower engine output range, up to reaching an output 11, only a first exhaust gas turbocharger is engaged. The charging air pressure produced by the single exhaust gas turbocharger is represented by the curve 12. Since all of the exhaust gases of the piston driven internal combustion engine are fed to this exhaust gas turbocharger in this phase of operation, it reaches during operation of the internal combustion engine, with an output 11, its operating point rated for the operation with all three turbochargers at full load. It thereby supplies a charging air pressure 13.

In the middle output range, i.e., from the output 11 to the output 14 of the internal combustion engine, a second exhaust gas turbocharger is connected in parallel with the first exhaust gas turbocharger. The charging air pressure produced by the two exhaust gas turbochargers is indicated by the curve 15. The two exhaust gas turbochargers produce a charging air pressure 16 at the output 11 and a maximum charging air pressure 17 at the output 14.

In the upper output range, i.e., from the output 14 to full load 18 of the internal combustion engine, all three exhaust gas turbochargers are connected in parallel with each other. The charging air pressure produced by the third exhaust gas turbocharger is represented by the curve 19.

The gain in charging air pressure and therewith also in charging air quantity by the disengagement of exhaust gas turbochargers in the lower output range can be seen from the difference between the curve 19 and the curves 12, respectively, 15. As a result thereof, greater fillings and therewith higher torques can be achieved in this lower output range.

Figure 2:
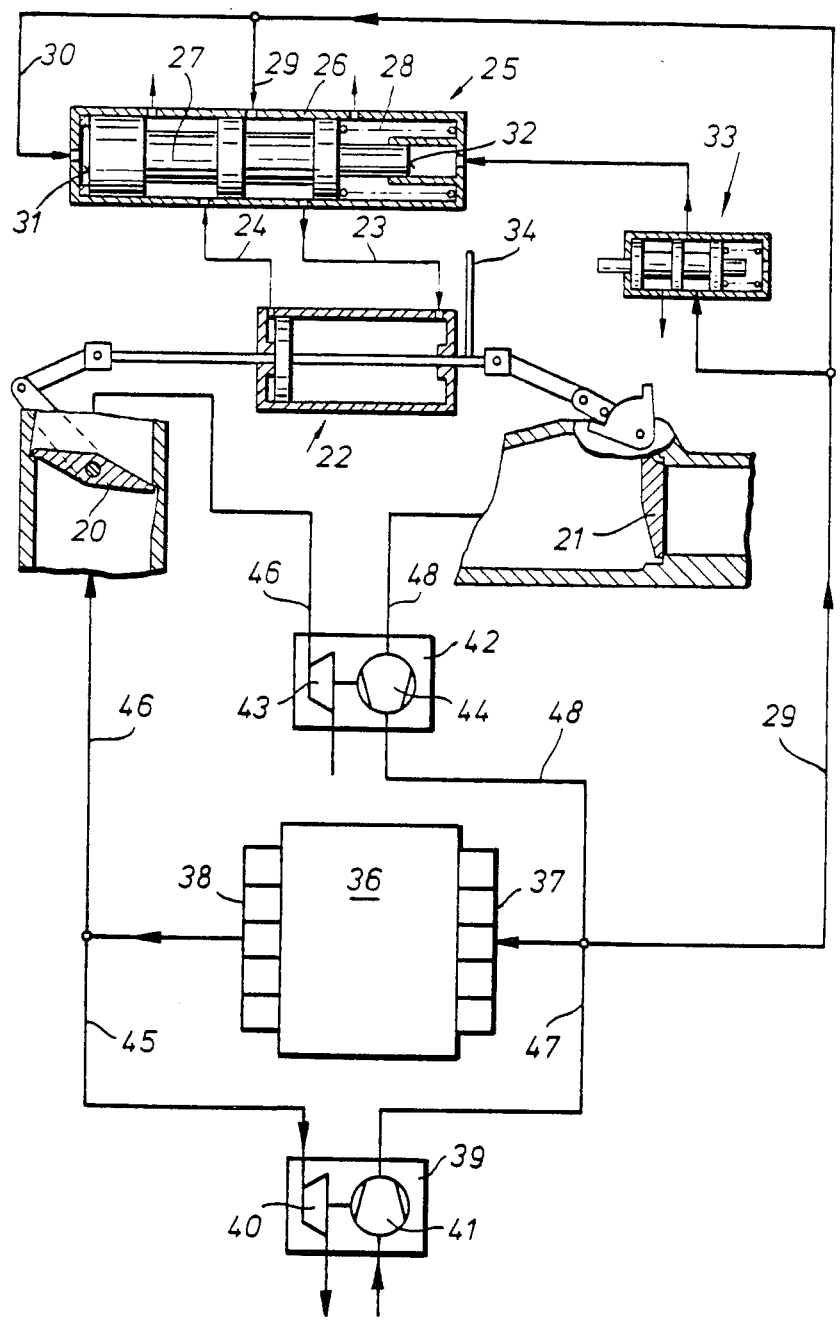
FIG. 2 is a somewhat schematic view of a control system in accordance with the present invention for the engagement and disengagement of an exhaust gas turbocharger, which includes exhaust gas and charging air valves, an actuating mechanism and a control device.

FIG. 2 shows an internal combustion engine 36 of conventional design with a boost air line 37 and exhaust line 38, an exhaust turbocharger 39, continuously engaged, with a turbine 40 and a compressor 41, an exhaust turbocharger 42 which can be switched on and off, with a turbine 43 and a compressor 44, as well as a control for switching exhaust turbocharger 42 on and off.

The exhaust from the internal combustion engine is fed to turbine 40 of exhaust turbocharger 39 through a line 45 and to turbine 43 of exhaust turbocharger 42 through a line 46. The exhaust gas turbocharger 39 is continuously engaged during engine operation while turbocharger 42 is disengageable, as will be discussed below. The boost air is fed to the internal combustion engine via compressor 41 of exhaust turbocharger 39 and a line 47 and via compressor 44 of exhaust turbocharger 42 and a line 48.

An exhaust valve 20 is located in line 46 and a boost air valve 21 is located in line 48 upstream of compressor 44. When these two valves are closed, exhaust turbocharger 42 is rendered inoperable or shut off. When these two valves are open, exhaust turbocharger 42 is turned on again. Valves 20 and 21 are selectively opened or closed by an actuating mechanism generally designated by reference numeral 22 corresponding to the requirements of the piston internal combustion engine and therewith the associated exhaust gas turbocharger is engaged, respectively, disengaged for the charging air supply. The actuating mechanism 22 is controlled by way of lines 23 and 24 by a control device generally designated by reference numeral 25 which is in the form of a spool valve assembly and which includes a spool-type slide valve member 27 within a housing 26, which is forced by the force of a spring 28 acting thereon into the illustrated position for the disengagement of the exhaust gas turbocharger. The charging air pressure of the piston driven internal combustion engine is fed to the control device 25 by way of the line 29, respectively, 30 as working medium for the actuating mechanism 22 and as control pressure for the control device 25. The slide valve member 27 includes a first control end face 31, on which the charging air pressure acts as first control pressure opposite the force of the spring 28. The slide valve member 27 additionally includes a second control end face 32, on which a second control pressure formed from the charging air pressure acts when an exhaust gas turbocharger is disengaged. The second control pressure acting in the same direction as the force of the spring 28 acts on the slide valve member 27. The second control pressure is disconnected and vented by the actuating mechanism 22 during the opening of the exhaust gas and charging air valve 20, respectively, 21 by means of an abutment 34 and by way of a valve generally designated by reference numeral 33. The valve 33 may be of conventional construction and is interposed in a branch of line 29 for controlling the application of the second control pressure to the second control end face 32.

As described, after the start of the piston driven internal combustion engine, only a first exhaust gas turbocharger is in operation in the idling speed and lower output range. The engagement installation for the second exhaust gas turbocharger which operates in the middle output range, in parallel with the initially operating exhaust gas turbocharger is initially in the position illustrated in FIG. 2. With an increasing output of the engine, the charging air pressure also increases corresponding to the curve 12 (FIG. 1). The increasing amount of charging air pressure acts on the first control end face 31 of the slide valve member 27 as a first control pressure by way of the line 30 until, after reaching the charging air pressure 13, the force of the spring 28 and the second control pressure acting on the control end face 32 are overcome thereby and the control slide valve member 27 is forced into its other end position. The line 23 is now vented and the actuating mechanism 22 is acted upon with pressure by way of the line 24. As a result thereof, the exhaust gas valve 20 and the charging air line valve 21 are opened and therewith the second exhaust gas turbocharger is additionally engaged. At the same time, the second control pressure which heretofore acted on the second control end face 32 of the slide valve member 27 is cut off and vented by way of the valve 33 which is actuated by abutment 34. As a result of this measure, the charging air pressure acting on the first control end face 31 is capable of holding the control slide valve member 27 in the engaging position against the force of the spring 28 even when there is a pressure decrease in the charging air pressure 16 so that the immediate redisengagement of the second exhaust gas turbocharger by reason of the charging air pressure drop is avoided. With a further increase of the output, the charging air pressure rises corresponding to the curve 15 up to the charging air pressure 17, at which time the engagement of the third exhaust gas turbocharger is carried out by way of a corresponding control system, in a manner similar to the manner described hereinabove.

With a decrease of the output of the piston driven internal combustion engine, for example, from the output 14 to the output 11, the charging air pressure decreases corresponding to curve 15. If the output decreases still further, the charging air pressure drops below the charging air pressure 16 and therewith the disengagement of the second exhaust gas turbocharger is initiated, taking into consideration an appropriate hysteresis avoiding the hunting by engagement and disengagement. This takes place when the force of the spring 28 overcomes the charging air pressure acting on the first control end face 31 and displaces the slide valve member 27 into the illustrated position for the disengagement. As a result thereof, the line 24 is vented and the actuating mechanism 22 is brought into the illustrated position shown in FIG. 2 by the pressure in the line 23. The exhaust gas and charging air valves 20 and 21 are closed thereby. At the same time, the second control pressure now acts again on the second control end face 32 by way of the valve 33 so that the slide member 27 does not change its position after an increase of the charging air pressure but which increase is still below the charging air pressure 13.

The control for the engagement and disengagement of the third exhaust gas turbocharger is constructed in principle in the same manner as the control for the second exhaust gas turbocharger described hereinabove. However, in order that both controls do not respond at the output 11 by the charging air pressure 13, the engagement and disengagement of the third exhaust gas turbocharger takes place at slightly higher charging air pressures. The attainable pressure conditions in the exhaust gas turbocharger assist in practice these determinations at the corresponding outputs. The different charging air pressures can be taken into consideration in the individual control systems, for example, by different springs.

Figure 3:
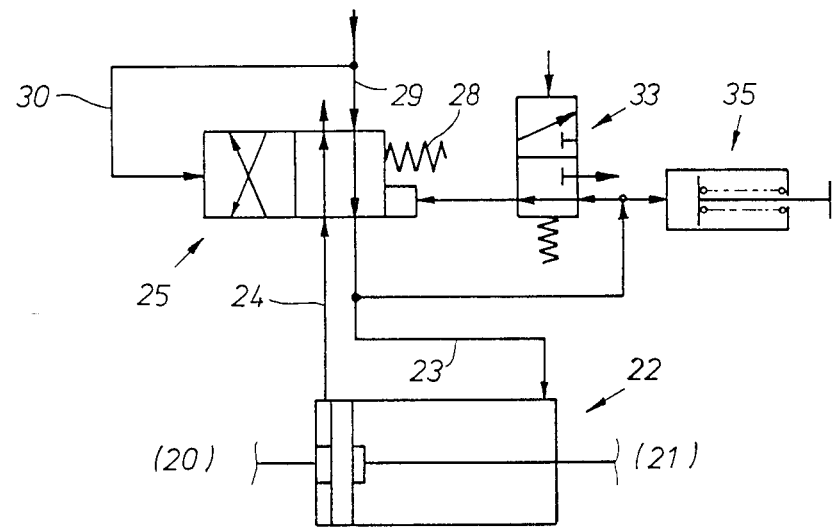
FIG. 3 is a schematic view of a modified embodiment of a control device in accordance with the present invention with a second control pressure acting in the same direction as the spring force.

FIG. 3 illustrates a modified control system in which, however, the control device generally designated by reference numeral 25, the actuating mechanism generally designated by reference numeral 22 and the valve generally designated by reference numeral 33 are constructed in a manner similar to FIG. 2 and have correspondingly the same operating effect as in FIG. 2. Differing from FIG. 2, however, the second control pressure is branched off by line 29a from the charging air pressure downstream of the control device 25 so that no separate pressure is necessary as second control pressure and the second control pressure is controlled by the control device 25. Additionally, a control rack abutment 35 is also acted upon by the second control pressure. The control rack abutment includes an actuatable cylinder which is engageable with the control rack which in turn determines the engine output. The adjustment to full filling in the piston driven internal combustion engine is therewith precluded as long as the exhaust gas turbocharger is not yet engaged. When a third control pressure acts on the valve 33, the engagement of the exhaust gas turbocharger can be brought about without the need for the charging air pressure magnitudes otherwise required therefor to be present.

Figure 4:
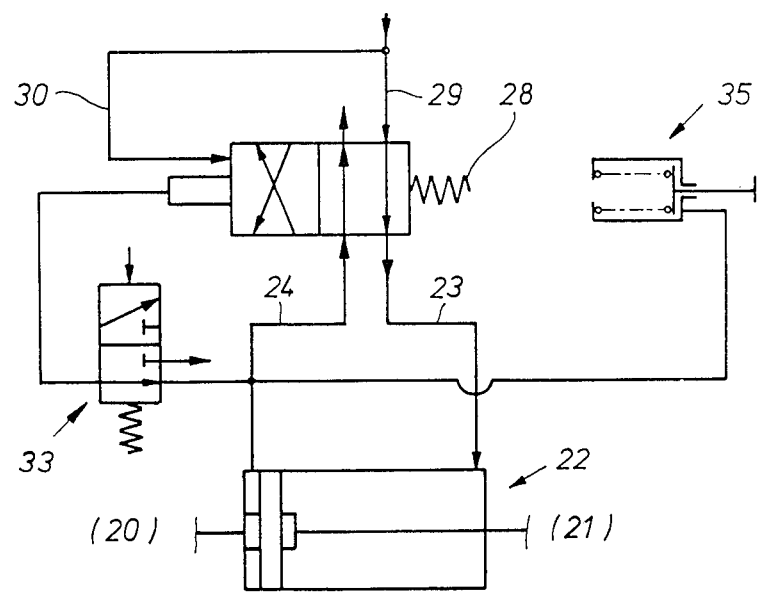
FIG. 4 is a schematic view of a still further modified embodiment of a control device in accordance with the present invention with a second control pressure acting opposite the spring force.

FIG. 4 illustrates a further modified embodiment of a control system with similar elements as in FIG. 3. However, with an engaged exhaust gas turbocharger, the second control pressure acts on the control slide valve member 25 opposite the force of the spring 28. By the interaction of a third control pressure on the valve 33, the disengagement of the engaged exhaust gas turbocharger can be initiated without having to initiate the otherwise necessary decrease of the charging air pressure below the charging air pressure 16.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A control system for engagement and disengagement of an exhaust gas turbocharger for a piston driven internal combustion engine comprising actuating means operatively associated with valve means for disengaging the turbocharger by shutting off exhaust gas flow to and charging air flow therefrom and means for controlling said actuating means, said means for controlling including a slide member shiftable from a position wherein the turbocharger is disengaged to another position wherein the turbocharger is engaged, the slide member including a first control end face and a second control end face, spring means for biasing the slide member toward the position wherein the turbocharger is disengaged, a first control pressure connected to the means for controlling acting on the first control end face of the slide member against the bias of the spring means and an additional control pressure connected to the means for controlling acting on the second control end face and means for reducing said additional control pressure in response to said first control pressure shifting said slide member from the position wherein the turbocharger is disengaged to the another position wherein the turbocharger is engaged.

2. A control system according to claim 1, wherein the additional control pressure acts by way of the second control end face on the slide member in the same direction as the spring force of the spring means.

3. A control system according to claim 2, wherein the means for reducing closes off the additional control pressure to bring about the engagement of the associated exhaust gas turbocharger without the presence of a charging air pressure magnitude otherwise required therefor.

4. A control system according to claim 1, wherein the additional control pressure acts by way of the second control end face on the slide member in the same direction as charging pressure acting on the first control end face.

5. A control system according to claim 4, wherein means are included for closing off the additional control pressure by a third control pressure so that the disengagement of the associated exhaust gas turbocharger can be brought about without the occurrence of the decrease of charging air pressure otherwise necessary therefor.

6. A control system according to claim 1, wherein the additional control pressure is controlled by the slide member of the control means.

7. A control system according to claim 6, wherein the additional control pressure is controlled by the actuating means.

8. A control system according to claim 6, wherein the additional control pressure is formed by charging air pressure.

9. A control system according to claim 1, wherein the additional control pressure additionally actuates a cylinder for a control rack abutment in such a manner that the control rack of the piston driven internal combustion engine is operable to traverse only a part of its control rack travel with a disengaged exhaust gas turbocharger.

10. A control system according to claim 1, wherein the means for controlling includes control passages for the working medium for the actuating means.

11. A control system according to claim 1, wherein the slide member is operable to actuate an electric switch for a solenoid valve controlling the working medium of the actuating means.

12. A control system according to claim 6, wherein the additional control pressure acts by way of the second control end face on the slide member in the same direction as the spring force of the spring means.

13. A control system according to claim 12, wherein the means for reducing closes off the additional control pressure to bring about the engagement of the associated exhaust gas turbocharger without the presence of a charging air pressure magnitude otherwise required therefor.

14. A control system according to claim 6, the additional control pressure acts by way of the second control end face on the slide member in the same direction as charging air pressure acting on the first control end face.

15. A control system according to claim 14, wherein means are included for closing off the additional control pressure by a third control pressure so that the disengagement of the associated exhaust gas turbocharger can be brought about without the occurrence of the decrease of charging air pressure otherwise necessary therefor.

16. A control system according to claim 1, wherein the additional control pressure is controlled by the actuating means.

17. A control system according to claim 16, wherein the additional control pressure acts by way of the second control end face on the slide member in the same direction as the spring force of the spring means.

18. A control system according to claim 1, wherein the additional control pressure is formed by charging air pressure.

19. A control system according to claim 18, wherein the additional control pressure acts by way of the second control end face on the slide member in the same direction as the spring force of the spring.

20. A control system according to claim 19, wherein the means for reducing closes off the additional control pressure to bring about the engagement of the associated exhaust gas turbocharger without the presence of a charging air pressure magnitude otherwise required therefor.

21. A control system according to claim 18, wherein the additional control pressure additionally actuates a cylinder for a control rack abutment in such a manner that the control rack of the piston internal combustion engine is operable to traverse only a part of its control rack travel with a disengaged exhaust gas turbocharger.

* * * * *